(12) United States Patent
Heubach et al.

(10) Patent No.: US 7,658,793 B2
(45) Date of Patent: Feb. 9, 2010

(54) PIGMENT COMPOSITION AND PROCESS FOR PREPARATION OF THE SAME

(75) Inventors: Rainer Heubach, Grossgmain (AT);
Yvonne Brussaard, Liebenburg (DE);
Hugo Brussaard, Liebenburg (DE)

(73) Assignee: Heubach GmbH, Langelsheim (DE)

( * ) Notice: Subject to any disclaimer, the term of this patent is extended or adjusted under 35 U.S.C. 154(b) by 0 days.

(21) Appl. No.: 10/548,516

(22) PCT Filed: Mar. 5, 2004

(86) PCT No.: PCT/EP2004/002303

§ 371 (c)(1),
(2), (4) Date: Nov. 9, 2006

(87) PCT Pub. No.: WO2004/078852

PCT Pub. Date: Sep. 16, 2004

(65) Prior Publication Data

US 2007/0079728 A1    Apr. 12, 2007

(30) Foreign Application Priority Data

Mar. 5, 2003   (DE) .............................. 103 09 813

(51) Int. Cl.
| | |
|---|---|
| *C08B 5/00* | (2006.01) |
| *C09B 67/50* | (2006.01) |
| *C09C 1/32* | (2006.01) |
| *C09C 1/36* | (2006.01) |
| *C08K 5/00* | (2006.01) |
| *C04B 14/20* | (2006.01) |
| *C04B 14/00* | (2006.01) |

(52) U.S. Cl. .............. 106/493; 106/410; 106/411; 106/412; 106/413; 106/414; 106/417; 106/426; 106/429; 106/441; 106/490; 106/494; 106/495; 106/496; 106/497; 106/498; 106/499

(58) Field of Classification Search ................ 106/288, 106/299, 302, 306, 308, 309, 482, 490, 493, 106/417, 426, 429, 410–414, 494–499, 441; 260/42.14; 523/216

See application file for complete search history.

(56) References Cited

U.S. PATENT DOCUMENTS 4,015,998 A    4/1977   Jaffe (Continued)

FOREIGN PATENT DOCUMENTS

EP           0 212 361  A2    3/1987

(Continued)

*Primary Examiner*—Anthony J Green
*Assistant Examiner*—Pegah Parvini
(74) *Attorney, Agent, or Firm*—Fay Sharpe LLP; Karl W. Hauber

(57) ABSTRACT

The invention relates to a pigment preparation based on at least one inorganic pigment and at least one organic pigment, and to a method for producing one such pigment preparation. Said pigment preparation contains particles wherein fine organic pigment particles are combined with inorganic pigment particles, said particles also being provided with an organic macromolecular coating. The inventive pigment preparation is produced by wet-grinding the inorganic and organic pigments, optionally adding other constituents, in the presence of a surface-active substance in the form of a macromolecular organic compound.

15 Claims, 4 Drawing Sheets

Raster-electron microscopical photograph, magnification 1:10,000.

U.S. PATENT DOCUMENTS

| | | | |
|---|---|---|---|
| 4,194,920 A | | 3/1980 | Burke, Jr. |
| 4,226,634 A | | 10/1980 | Dimroth et al. |
| 5,837,409 A | * | 11/1998 | Bertrand et al. ............ 430/45.4 |
| 5,856,543 A | * | 1/1999 | Friedrich et al. ............ 556/413 |
| 6,203,960 B1 | * | 3/2001 | Ciccarelli et al. ........ 430/108.7 |
| 6,503,970 B1 | | 1/2003 | Valin |
| 2002/0069790 A1 | * | 6/2002 | Hayashi et al. ............ 106/482 |
| 2002/0114940 A1 | * | 8/2002 | Clemens et al. .......... 428/318.4 |
| 2003/0091743 A1 | * | 5/2003 | Grasselli ..................... 427/256 |
| 2003/0101908 A1 | * | 6/2003 | Hayashi et al. ............ 106/417 |
| 2003/0144399 A1 | * | 7/2003 | Matta et al. ................. 524/419 |
| 2004/0206271 A1 | * | 10/2004 | Randler et al. ........... 106/31.28 |
| 2005/0075415 A1 | * | 4/2005 | Harz et al. .................. 523/160 |
| 2006/0051304 A1 | * | 3/2006 | Peng et al. .................... 424/59 |

FOREIGN PATENT DOCUMENTS

| | | | |
|---|---|---|---|
| EP | 0 816 440 A1 | | 1/1996 |
| EP | 0 985 712 A1 | | 3/2000 |
| WO | WO 02/49857 | * | 6/2002 |
| WO | WO 03/006556 | * | 1/2003 |
| WO | WO 03/008503 | * | 1/2003 |

* cited by examiner

Figure 1: Raster-electron microscopical photograph, magnification 1:10,000.

Particle size distribution in the inventive product, obtained according to Example 2 by means of laser light diffraction process.

Particle size distribution (determined with laser light diffraction process) in the inventive product in comparison with a usual commercial dry powder blend and a lead chromate standard.

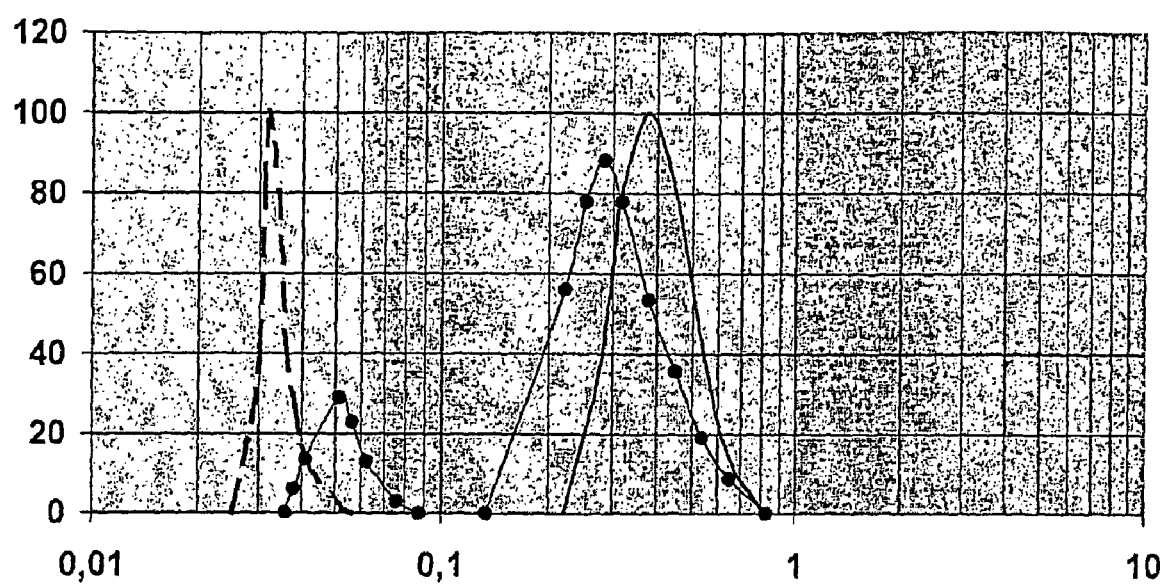
Figure 4: Particle size distribution, determined by photon-correlation spectroscopy.

PIGMENT COMPOSITION AND PROCESS FOR PREPARATION OF THE SAME

The invention relates to a pigment composition based on at least one inorganic pigment and at least one organic pigment and to a process for preparing such a pigment composition.

Pigment compositions based on at least one organic pigment and at least one inorganic pigment, which can be produced either by dry mixing or combined wet grinding, are state of the art. EP 0 816 440 B1 describes the production of pigment compositions based on bismuth vanadate and organic yellow, orange and red pigments. By producing a dry powder blend of bismuth vanadate with P.O. 73 there is obtained a pigment composition of increased colour purity in comparison with a mixture of pigment-containing lacquer formulations. U.S. Pat. No. 4,226,634 describes the preparation of a pigment composition with improved gloss from an organic pigment together with an inorganic pigment in an aqueous medium subjected to strong shearing forces. Furthermore, EP 0 985 712 B1 describes pigment compositions in the form of granulate with an average granulate particle size of 5 to 3.000 μm, of improved free-flow ability, and with reduced tendency to dust development. Furthermore, U.S. Pat. No. 6,503,970 B1 describes the invention of pigment compositions with improved thermal stability and the preferred use of chlorine-free organic pigments. The known pigment formulations are said to be suitable for dyeing polymer materials such as lacquers, printing inks, and plastics.

However, in the state of the art it turned out that pigment formulations as mixtures of inorganic colour pigments, particularly in the form of nickel-titanium and chromium-titanium, with organic pigments have shortcomings and that the shortcomings can be more or less reduced by the additional incorporation of titanium dioxide as an inorganic pure body pigment. The shortcomings of conventional pigment formulations containing nickel-titanium and chromium-titanium as mixture components relate mainly to clouding and the loss of gloss vis-a-vis compositions based on titanium dioxide and manifest themselves particularly when high-purity lead chromate or lead molybdate hues are to be reproduced. Thus, without using titanium dioxide in pigment formulations based on at least one inorganic and one organic pigment the desired colour hue cannot be obtained. High attrition by abrasion and low hiding power are further shortcomings, particularly in the case of nickel-titanium pigments.

The goal of the invention is therefore to provide pigment compositions based on at least one inorganic pigment and at least one organic pigment, which are free of the aforementioned shortcomings and which do not necessitate the incorporation of titanium dioxide. In particular, the workability and the performance characteristics of nickel-titanium and chromium-titanium pigments in mixtures with organic pigments are to be enhanced. Positive synergistic effects are to be obtained by improving the fastness to light and the realisation of increased colour intensity, caused by ultraviolet and blue absorption features of nickel titanium or chromium titanium. The applications are to show particular advantages in regard to fastness to light and weather fastness. A significant improvement of the fastness features without the colouring need to use titanium dioxide is to be achieved.

According to the invention, this problem is solved by a pigment composition based on at lest one inorganic and at least one organic pigment, with the pigment composition being characterised in that it contains particles in which more finely divided organic pigment particles adhere to inorganic pigment particles and that the particles have, in addition, an organic macromolecular coat.

Thus, it is the basic concept of the invention that organic pigment particles, which are more finely divided or have a smaller particle size than the inorganic pigment particle to be considered as the core, adhere to the surface of the inorganic pigment particle. Furthermore, this special structure which has not been disclosed in the prior has an additional molecular organic coating. This coating must not develop everywhere. However, a substantially complete coating is advantageous. This macromolecular organic coating develops, for example, in the course of the process according to the invention as described below by incorporation of suitable surface-active substances in the form of a macromolecular organic compound. This point will be discussed below.

BRIEF SUMMARY OF THE FIGURES

FIG. 4 is a particle size distribution of still another product according to still another example of the present disclosure.

Figure 1:
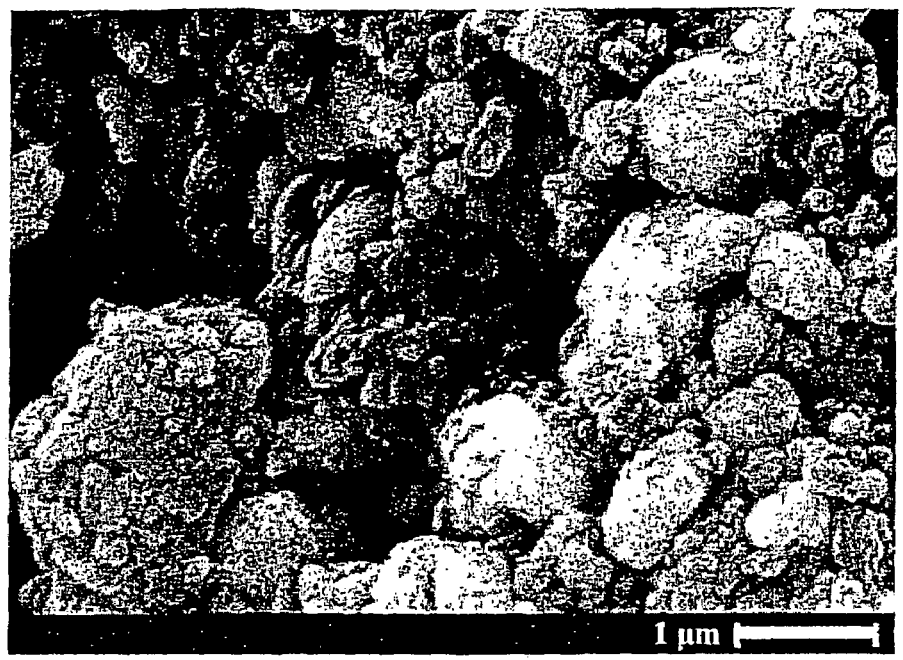
FIG. 1 is a raster-electron microscopical photograph of exemplary particles.

The special advantages which can manifest themselves with the pigment composition according to the invention in various applications may reside, inter alia, on this macromolecular coat without that it should be considered a binding explanation. Thus, the cited coat will lead to fixing of organic pigment particles on the inorganic pigment particles and will counteract the reagglomeration of the organic pigment particles which usually occurs in a drying operation. In later handling and use, this results in a reduced tendency to dust formation and improved dispersability.

Basically all inorganic pigments known in the technology under consideration can be used within the scope of the invention. However, a mixed-phase metal oxide, particularly a blended titanium dioxide pigment, is preferred as the inorganic pigment. Among them, nickel-antimony dtitanium oxide (C.I. Pigment Yellow 53) and/or chromium-antimony-titanium oxide (C.I. Pigment Brown 24) are particularly preferred. The pigments cited above in connection with the state of the art of EP 0 985 712 B1 are equally suitable as inorganic pigments. The use of zinc-zinc-titanate (PY 216) is particularly advantageous. The same may be used in addition to other inorganic pigments to reach the desired characteristics.

A variety of pigments are available to those skilled in the art when the organic pigments are to be selected to practice the present invention. Organic pigments in the form of polycylic and/or azo pigments are particularly preferred. Red, yellow, orange, blue, brown and/or green pigments proved to be the organic pigments of the invention. The red pigments are preferably present in the form of DPP Red (diketo-pyrrolopyrrole); the organic yellow pigments, in the form of isoindolinone and/or benzimidazalone; the orange pigments, in the form of DPP orange and/or isoindoline and/or benzimidazalone; the blue and green pigments, as Cu phthalocyanines; the brown pigments, as benzimidazalone and/or disazo condensation compounds. Mixtures of the above-listed pigments can be used to set the desired colour hue. As a rule, it is even preferred to use two or three different pigments in the pigment formulation according to the invention in order to adjust to the desired colour hue. In addition to the inorganic pigments there is a large number of organic pigments which can be considered for realising the composition according to the invention. This is shown by the following list of particularly suitable inorganic and organic pigments.

Rutil pigments in the form of C.I. Pigment Yellow 53, 157, 159, 160, 161, 162, 163, 164, and 189 and C.I. Pigment Brown 24, 29, 33, 37, and 40;

spinel pigments in the form of C.I. Pigment Yellow 119, C.I. Pigment Brown 33, 34, 35, and 39 and C.I. Pigment Blue 28, 36 and 72, C.I. Pigment Green 26, 50;

bismuth vanadate pigments in the form of C.I. Pigment Yellow 184, as well as derivatives with iso- and hetero-polyanions of the vanadate or its isomorphous substitute; cerium sulfide pigments in the form of C.I. Pigment Orange 75 and C.I. Pigment Red 265;

anthraquinone pigments in the form of C.I. Pigment Yellow 147 and 199;

anthrathrone pigments in the form of, for example, C.I. Pigment Red 168;

anthrapyrimidine pigments in the form of C.I. Pigment Yellow 108;

azo pigments in the form of C.I. Pigment Yellow 3, 12, 13, 14, 62, 74, 83, 93, 95, 120, 151, 154, 168, 175, 180, 181, 194, and 191:1, C.I. Pigment Orange 5, 13, 34, 36, 62, 64, 67, 72, C.I. Pigment Red 1, 2, 3, 4, 5, 23, 48:1, 48:2, 48:4, 49, 49:1, 51:1, 52:1, 53, 53:1 57:1, 58:2, 58:4, 112, 144, 148, 166, 176, 187, 184, 214, 220, 221, 251, and 262; C.I. Pigment Brown 23, 25;

azomethine pigments in the form of C.I. Pigment Yellow 129;

chinacridone pigments in the form of C.I. Pigment Orange 48 and 49 and C.I. Pigment Red 42, 122, 202, and 206; C.I. Pigment Violet 138;

quinophthalone pigments in the form of C.I. Pigment Yellow 138:

diketopyrrolopyrrol pigments in the form of C.I. Pigment Orange 71 and 73 and C.I. Pigment Red 254, 255, 264, 270, and 272;

indanthrone pigments in the form of C.I. Pigment Blue 60 and 64;

isoindoline pigments in the form of C.I. Pigment Yellow 139 and 185, C.I. Pigment Orange 61 and 69 and C.I. Pigment Red 260;

isoindoline pigments in the form of C.I. Pigment Yellow 109, 110, and 173;

metal complex pigments in the form of C.I. Pigment Yellow 117, 150, 153, and 177;

perinone pigments in the form of C.I. Pigment Orange 43 and C.I. Pigment Red 194;

perylene pigments in the form of C.I. Pigment Red 123, 149, 178, 179, 190, and 224;

phthalocyanine pigments in the form of C.I. Pigment Blue 15, 15:1, 15:2, 15:3, 15:4, 15:6, and 16;

pyranthrone pigments in the form of C.I. Pigment Orange 51 and C.I. Pigment Red 216;

pyrazolo-quinazolone pigments in the form of C.I. Pigment Omange 67 and C.I. Pigment Red 251; and thioindigo pigments in the form of C.I. Pigment Red 88.

Homogeneous crystalline organic mixed-phase pigments, in which suitable molecules, mainly polycylic varieties are—broadly speaking—combined in a "solid solution" and form a proper pigment phase are to be interpreted as an organic component within the concept of the invention. In particular, the red, orange, and yellow pigments must be related to the following pigment classes: diketo-pyrrolo-pyrrol, quinacridone, benzimidazolone, disazocondensates, isoindolines, isoindolinones, metal complex as high performance pigment, as well as the following azo pigments: PY 65, PY 74, PY 83, PY 97, PY 116, PY 183, PY 190, PY 191, as well as PR 112, and PR 170.

In order to achieve the advantages intended with the pigment composition according-to the invention or, respectively, to solve the above-defined problem, a relation between the particle size of the inorganic pigments and of the organic pigments must be established because the organic pigment particles are to be more finely divided, i.e. smaller, than the inorganic pigment particles. For stating some guiding principle, it is preferred to have an average particle size between about 0.08 and 10 μm, particularly between about 0.2 and 4 μm, for the inorganic pigments, with the range of 0.5 to 2 μm being especially preferred. By contrast, an average particle size of about 0.005 to 3 μm, especially of about 0.025 to 0.3 μm, is preferred for the organic pigment. Thus, starting from the particle size of the inorganic pigment, those skilled in the art will select in regard to particle size an organic pigment with an average particle size 3 to 40 times below that of the inorganic pigment so that the basic concept of the invention, namely adhesion of more finely divided organic pigment particles on inorganic pigment particles, can be put into effect. The particle size of the composite of inorganic pigment and more finely divided organic pigment results from the particle size of the respective selected inorganic pigment and that of the more finely divided organic pigment. A particle size of about 0.3 to 10 μm, particularly of about 0.5 to 5 μm, is preferred for the particles comprising the inorganic pigment particles together with the more finely divided organic pigment particles. A size between about 0.5 and 2.5 μm of these particles is particularly preferred.

The weight ratio between the organic pigment and the inorganic pigment in the pigment composition of the invention does not have critical limits. About 0.5 to 150 parts by weight of inorganic pigment per 1 part by weight of organic pigment are advantageous.

The quantitative composition can be optimised with a view to the respective desired colour hue. One part by weight of organic pigment per 1 to 4 parts by weight of the inorganic pigment are typical for saturated colours, and 1 part by weight of organic pigment per 20 to 100 parts by weight of inorganic pigment are typical for pastel colours, always in dependence upon the degree of brightness.

It may be advantageous in individual cases to incorporate in the inventive pigment composition fillers, especially in the form of barium sulfate, silica, talcum, calcium carbonate and/or aluminium oxide. These fillers may serve to adapt specific characteristics, such as tinting strength, hiding power, and resistance to abrasion, to the intended application goals.

If specific additional characteristics not yet provided by the inventive pigment composition are to be obtained, additional other pigments may be used to achieve the desired control of characteristics. For example, titanium dioxide may be used to advantage as an additional pigment to control the purity of the colour; bismuth vanadate, for controlling colour saturation; and/or lithopone for controlling the degree of brightening. The amount of additionally incorporated filler and/or pigment is chosen so that the characteristics to be obtained with the pigment composition according to the invention are not substantially impaired.

The importance of the macromolecular organic coating of the particles of the pigment composition according to the invention has already been noted. The selection of the surfactants likewise offers a possibility of adjustment to the desired features. The selected surface-active materials are compounds of high molecular weight, typically from the group of wetting and dispersing aids, and preferably are of the chemical classes of organically modified polyacrylates, the modified fatty acid-derivatives, the block copolymers with surfactant functions and/or alkylammonium salts of polyfunctional polymers.

In the examples, these classes of substances are represented in exemplary form by commercial products without restricting in this way to any extent the teachings of the patent. Preferred are combinations of organically modified polyacrylates with polymaleic acid ammonium salts, alkylammonium salts of copolymers with acid groups together with polymaleic acid ammonium salts, as well as ethoxylated and phosphatised long-chain alkylamine salts of polymeric oleyl alcohol by itself or in combination with polymaleic acid ammonium salts.

The groups which comprise these polymers can be termed "pigment-affine groups." Thus, they should lead to a strong bond between an inorganic and an organic pigment, on the one hand, and to setting the desired dispersability in the materials into which the inventive pigment composition is incorporated, on the other hand. They are, in particular, liquid, but preferably solvent-free polymers, and especially surface-active substances which show strong absorption capabilities on organic, as well as on inorganic, pigment surfaces. Even when added in small amounts, this type of compounds effects a large reduction of the viscosity, particularly in aqueous pigment dispersions. The substance should be universally compatible with both aqueous and solvent-containing lacquer systems. There are no critical limits to the amounts used. About 0.1 to 10% by weight, referred to the pigment fraction (organic plus inorganic pigment), specifically about 0.2 to 6.0% by weight, are preferably incorporated. Further preferred is the range of about 0.5 to 3.3% by weight, with an amount of about 0.8 to 1.7% by weight, particularly of about 1.0 to 1.5% by weight, being especially preferred.

There are further possibilities for achieving adjustments. Thus, in some cases preferably the surface of particles provided with the inorganic or organic pigments can be given an additional siloxane coating. As an alternative to a polysiloxane compound, a functionalised polysilane or an emulsified polyethylene wax can be employed. Above all, this coating helps to reduce the attrition by abrasion of the particles and serves to improve dispersability in various media in which the pigment composition according to the invention is to be integrated. The siloxane coating preferably is based on a polysiloxane compound, particularly modified with polyether segments. Polysiloxane compounds and/or polysilane compounds provided with alkyl and/or aryl groups are preferred. In particular, the alkyl groups are $C_1$-$C_{12}$ alkyl radicals, preferably $C_2$-$C_5$ alkyl radicals. The aryl group is preferably a naphthyl, benzyl and/or phenyl group.

When the pigment composition according to the invention is prepared with proper regard for the above-discussed physical and/or chemical properties, one proceeds to wet-grind the particles of the inorganic and organic pigments, optionally with addition of further components, in the presence of a surface-active substance in the form of a macromolecular organic compound; to desiccate and deagglomerate the resulting aqueous suspension, particularly with consideration for the afore-described particularly advantageous particle dimensions. Wet grinding is preferably effected in an aqueous medium, but in particular cases it may be advantageous to add to the aqueous medium water miscible organic solvents to adjust to the desired surface tension and/or wetting characteristic. These may be organic solvents, protic or aprotic, or also mixtures of the same. Among the suitable protic organic solvents there are, for example, monovalent aliphatic alcohols, particularly $C_2$-$C_{12}$ alcohols and polyvalent alcohols, particularly $C_2$-$C_3$ alkylene glycols and ether alcohols, particularly $C_2$-$C_3$ alkylene glycol-$C_1$-$C_4$ alkyl ether. There are listed particularly suitable compounds, namely: ethanol, propanol, butanol and/or diethylene glycol. Among the suitable aprotic organic solvents there are, for example, cyclic ethers such as tetrahydrofurane. The amount of pigment in the aqueous suspensions subjected to wet grinding is preferably between about 10 and 70% by weight, particularly about 30 to 60% by weight. It is indispensable for the process according to the invention that the wet grinding is carried out in the presence of a surfactant which is macromolecular and organic. This serves to wet both the organic and inorganic pigment particles and to establish intimate contact between the two components.

After controlled termination of the grinding operation with proper regard for the advantageously intended particle size of the process product, and taking into account the above-indicated relations between the particle size of the inorganic and of the organic pigment, the wet grinding of the aqueous suspension is concluded within a suitable time period. As a rule one can state that the grinding is finished when all agglomerates greater than 5 to 10 μm have been broken down. The larger inorganic pigment particles fulfill also the function of a grinding aid for the organic pigment. Ball mills and agitator ball mills with closed or open structure, of vertical or horizontal arrangement, as well as radial agitator ball mills, are suitable as grinding devices. Agitator ball mills of horizontal design are preferably used. After that, there is effected drying, which can be done with the conventional drying means, particularly with a belt, vacuum or spray dryer or with the spin-flash process or the fluidised bed process. It must be ensured in each case that thereafter deagglomeration proceeds so far that the desired characteristics of the resulting powder are obtained or that the above-problem to which the invention relates is solved.

Deagglomeration of the agglomerates contained in the pigment composition during its preparation is effected for instance with hammer mills, iron-disk mills, impact mills or separator mills but deagglomeration can also be integrated in the drying process proper, for example in the form of drying by grinding.

The pigment composition according to the invention can be used in greatly different technical fields for dyeing some material. The pigment composition of the invention is particularly advantageous in the paint and varnish, paper, plastics, printing inks, and building materials industries. Advantages are recognised in the fact that the pigment composition has high gloss and colour purity and that it shows good dispersing features in both solvent-containing and aqueous systems, as well as in plastics. These features can be likewise used to advantage in dyeing paper or imprinting paper and in the production of laminates.

As to handling the products according to the invention, the tendency to dust formation is reduced by the organic macromolecular coating relative to a pure organic pigment and/or a commercial dry powder pigment blend.

In addition, the bulk densities of the pigment compositions according to the invention are of the order of magnitude of pure inorganic pigments so that handling is significantly simplified in comparison with organic pigments or dry powder pigment blends. Typical values of the bulk density of the pigment compositions according to the invention are between 0.5 and 1.2 $g/cm^3$, preferably between 0.6 and 0.9 $g/cm^3$.

The invention will be explained in greater detail by way of various examples characterising in typical fashion the invention without restricting in this way the scope of the invention to any extent.

EXAMPLE 1

Formulation of a Red Hue.

1 part of P.R. 272 (DPP Red) together with 4 parts of P.Br. 24 (chromium-titanium) and added 0.05 to 0.1 parts of Disperbyk (block copolymer of high molecular weight with pigment-affine groups) are X mixed with 3 to 10 parts of water. The resulting slurry is wet ground and thereafter dried and deagglomerated.

EXAMPLE 2

Formulation of a Yellow Hue.

1 part of P.Y. 154 (benzimidazolone) together with 2 parts of P.Y. 53 (nickel-titanium) and added 0.03 to 0.06 parts of Tego Dispers 745W (organically modified polyacrylate) are mixed with 3 to 10 parts of water. The resulting slurry is wet ground and thereafter dried and deagglomerated.

EXAMPLE 3

After wetting the surface with the aid of a dispersing additive, a second coating with a siloxane compound can be applied. To this end, the pigment paste obtained in the wet grinding operation is mixed with a polydimethyl siloxane (for example, PDMS-T21-trimethylsiloxy, obtained from ABCR or a similar manufacturer) and then dried and deagglomerated after a second wet grinding operation. The inventive product obtained in this way has in comparison with the uncoated pigment lower attrition by abrasion and improved dispersability (Table 1).

TABLE 1

Abrasive wear and tinting strength development of the inventive product of Example 3 in comparison with a conventional blend or the pure organic pigment.

|  | abrasive wear * | tinting strength development ** |
|---|---|---|
| conventional commercial blend | 0.111% | 35% |
| inventive product, as per Example 3 | 0.051% | 67% |
| P.R. 272 (DPP red) | not determined | 28% |

Remark:
* Abrasive wear was determined by abrasion at steel balls, caused by the pigment, dispersed in a mineral oil mixture. The sample was intensively shaken for 1 hour on a Scandex dispersing machine.
** Resulting tinting strength (expressed in %) vis-a-vis the fully dispersed sample after 20 min dissolution at about 12 m/s in a medium-heavy oily alkyd-resin white varnish.

EXAMPLE 4

Particle Size and Appearance

A raster electron micrograph of the product according to the invention shows in 1:10.000× magnification the presence of inorganic pigment particles to which the more finely grained organic pigment particles adhere. This is illustrated in the appended FIG. 1. It is also recognised that the organic pigment particles of the examined pigment formulation of Example 1 are by a factor of 3 to 20 smaller than the organic pigment particles.

Figure 2:
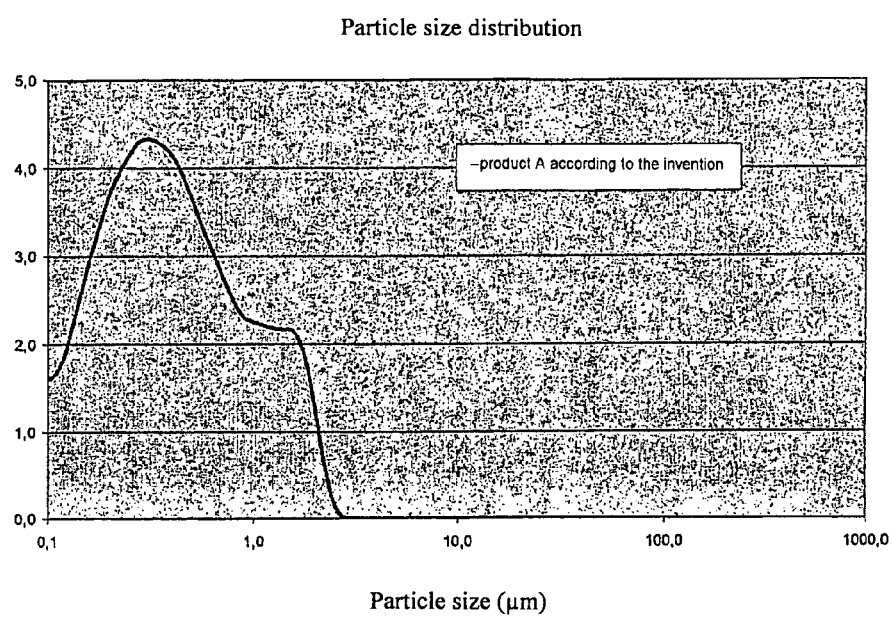
FIG. 2 is a particle size distribution of a product according to one example of the present disclosure.
Figure 3:
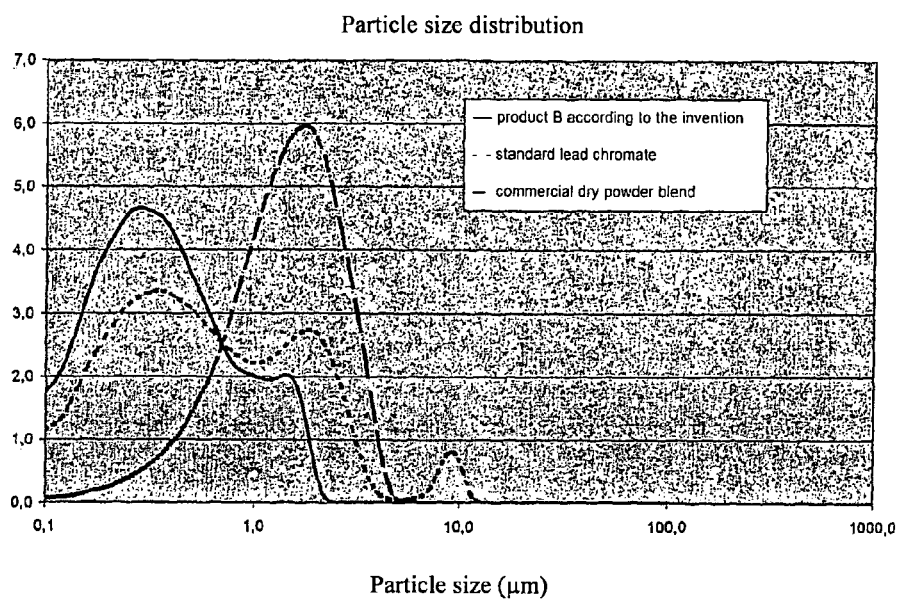
FIG. 3 is a particle size distribution of another product according to another example of the present disclosure in comparison with a commercial dry powder blend and a lead chromate standard.

The particle size distribution of the inventive product of Example 2 was determined by means of laser light diffraction and has an average particle size of 0.4 µm with a grain spectrum from 0.1 to 2.5 µm. (Median value of the grain size distribution: 0.4 µm.; maximum size at 2.5 µm.) In this connection, reference is made to appended FIG. 2.

EXAMPLE 5

Comparison Example

The particle size distribution of the inventive product obtained in accordance with Example 2 was compared with that of a standard lead chromate and a conventional dry powder blend of the same colour range. The comparison is illustrated in appended FIG. 2.

EXAMPLE 6

Comparison Example

Compared with a standard molybdate red or a customary dry powder blend of the same colour range, the inventive product of Example 1 has a significantly better hiding power and a substantially higher colour intensity.

TABLE 2

Hiding power and tinting strength of the product according to the invention in comparison with customary trade standards

|  | hiding power, relative to titanium dioxide | tinting strength |
|---|---|---|
| inventive product, as per Example 1 | 178% | 189% |
| Heucotron T 8025 (molybdate red) | 116% | =100% |
| Ecopaque 12303, commercial dry blend | 89% | 98% |

EXAMPLE 7

Comparison Example

The weathering fastness of the products according to the invention is significantly better than that of a blend with titanium dioxide of the same colour range and reaches the excellent fastness features of a stabilised lead chromate type. The determinations were made by way of fast weathering of a pigment-containing lacquer (water-diluted styrene acrylate).

TABLE 3

Fastness features of the pigment formulation according to the invention in comparison with a blend containing titanium dioxide. There is indicated the change in the hue after fast weathering in the ATLAS 1200 CPS xenon test unit in accordance with DIN EN ISO 11341 (2/98 issue) with the following parameters: energy density 60 W/m², UV filter 3× Suprax, wet/dry cycle 18:102 min.

|  | Delta E after 3500 h XENO test according to ISO 11341 |
|---|---|
| product of the invention | 0.8 |
| 1 part P.Y. 95, 3 parts titanium dioxide | 5.1 |
| Heucotron HT 5 SN (stabilised bright-colour lead chromate) | 1.1 |

EXAMPLE 8

Comparison Example

Colour intensity and purity of the colour tone could be clearly improved over a customary dry powder blend based on nickel-titanium and organic pigments as well as over a mixture of titanium dioxide and organic pigments.

TABLE 4

Data of colour measurements on the product according to the invention in comparison with dry powder blends based on the state of the art.
Product according to the invention:
pure colour in an alkyd-melamine baking lacquer

| versus standard: | DL* | Da* | Db* | DC* | DH* | DE |
|---|---|---|---|---|---|---|
| conventional dry powder blend based on nickel-titanium | 0.84 | 4.08 | 5.36 | 6.20 more yellow | −2.63 greater purity | 6.97 |
| blend with titanium dioxide | −1.10 | 4.70 | 5.62 | 6.59 more yellow | −3.19 greater purity | 7.41 |

EXAMPLE 9

Comparison Example

The inventive product obtained as per Example 1 has lower dust development and higher bulk density than a pure organic pigment or a dry pigment blend customary in the trade.

TABLE 5

Dust characteristics and bulk density

|  | dust characteristics (DIN 55992-1) mg/100 g | bulk density DIN ISO 787, part 11, g/cm³ |
|---|---|---|
| product according to invention | 420 | 0.8 |
| P.R. 272 (DPP red) | 2200 | 0.2 |
| Ecopaque 12303, , commercial dry blend | 1700 | 0.3 |
| chromium-titanium P.Br. 24 | 100 | 0.9 |

Remark: The values DL*, Da*, Db*, CC*, DH* and DE were determined according to DIN 6174.

EXAMPLE 10

0.1 to 1 parts of organic pigment together with 1.5 to 4 parts (P.Y. 53) nickel-titanium or chromium-titanium (P.Br. 24) with addition of 0.02 to 0.06 parts of Tego® Dispers 745W (organically modified polyacrylate) and 0.005 to 0.01 parts T Nuosperse® FX 600 (polymaleic acid ammonium salt) for products 1, 2 and 5 or 0.01 to 0.05 parts Nuosperse® 2008 (fatty amine salt of a polymeric oleyl alcohol, ethoxylated and phosphatised) for products No. 3 and 4 are mixed with 3 to 10 parts water. The slurry obtained is wet ground and then dried and deagglomerated. The composition corresponds to examples 1 to 5 as indicated in Table 1a. The colour data of the inventive products obtained in this way are shown in the following table in comparison to a customary dry powder blend based on nickel-titanium and organic pigments

TABLE 6

Data of colour measurements on the product according to the invention in comparison with dry powder blends based on the state of the art.

| | composition | | colour-measurement data vs. conventional mixture | | | | | | |
|---|---|---|---|---|---|---|---|---|---|
| No. | organic pigment | inorganic pigment | DL* | Da* | Db* | DC* | DH* | DE | visual evaluation |
| | | | yellow hues | | | | | | |
| 1 | 1 part P.Y. 138 | 4 parts P.Y. 53 | −0.24 | −0.03 | 2.10 | 2.10 | −0.05 | 2.11 | purer, yellower |
| 2 | 1 part P.Y. 180 | 2 parts P.Y. 53 | 1.01 | 0.62 | 2.20 | 2.26 | −0.35 | 2.50 | purer, yellower |
| 3 | 1 part P.Y. 180 0.1 pt. P.Y. 139 | 2 parts P.Y. 53 | 1.20 | 0.43 | 1.93 | 1.98 | 0.13 | 2.32 | purer, yellower |
| | | | red hue | | | | | | |
| 4 | 1 part P.R. 254 | 3 parts P.Br. 24 | −0.26 | 1.35 | −0.47 | 0.92 | −1.10 | 1.45 | redder more brilliant |
| | | | green hue | | | | | | |
| 5 | 1 part P.Y. 151 0.5 pt. P.G. 36 | 3 parts P.Y. 53 | −080 | −1.85 | −2.20 | −0.10 | 2.87 | 2.98 | greener more brilliant |

Table 6 shows the colour data of the products according to the invention in comparison with conventional blends. It follows from the data that the products are clearly of greater purity and more brilliant and this holds for all the pigment combinations indicted and the various colour hues.

Table 7 shows the advantages of the inventive products in regard to gloss and hiding power in comparison with state of the art dry powder blends. Also these data show that the advantages apply to various pigment combinations and colour hues.

TABLE 7

Gloss and hiding power of the product according to the invention in comparison with state-of-the-art dry powder blends.

| No. | composition | | gloss 20° | gloss 60° | relative hiding power |
|---|---|---|---|---|---|
| | organic pigment | inorganic pigment | | | |
| 1 | 1 part P.Y. 138 | 4 parts P.Y. 53 | 76.4 | 94.7 | 112% |
| 1b | conventional dry powder blend | | 57.3 | 85.8 | =100 |
| 4 | 1 part P.R. 254 | 3 parts P.Br. 24 | 84.7 | 95.9 | 117% |
| 4b | conventional dry powder blend | | 45.7 | 82.2 | =100 |
| 5 | 1 part P.Y. 151 0.5 parts P.G. 36 | 3 parts P.Y. 53 | 82.8 | 93.6 | 137% |
| 5b | conventional dry powder blend | | 46.1 | 84.2 | =100 |

EXAMPLE 11

Comparison Example

Preparation of a pigment blend 6a with the process according to the invention:

1 part P.Y. 138 with 4 parts P.Y. 53 (nickel-titanium) with addition of 0.02 to 0.06 parts of Tego® Dispers 745W (organically modified polyacrylate) and 0.005 to 0.01 parts T Nuosperse® FX 600 (polymaleic acid ammonium salt) are mixed with 3 to 10 parts water. The slurry obtained is wet ground and then dried and deagglomerated.

Preparation of a pigment blend 6b of the same composition but made with the preparation process described in patent DE 28 44 943 (1):

1 part P.Y. 138 and 4 parts P.Y. 53 (nickel-titanium) are mixed with 3 to 10 parts water. The slurry obtained is wet ground (Scandex) and then dried and deagglomerated.

Standard: pigment mixture 6b according to DE 28 55 943 inventive product 6a vs. 6b

| | DL* | Da* | Db* | DC* | DH* | DE | visual evaluation |
|---|---|---|---|---|---|---|---|
| in PU hue | −1.33 | 2.38 | 3.08 | 2.99 | −2.50 | 4.11 | purer, yellower |
| 1:10 brightening | −0.15 | 0.49 | 1.66 | 1.53 | −0.82 | 1.74 | purer, yellower |
| tinting strength | | | | 110% | | | |

Colour saturation and colour purity are clearly improved vis-a-vis the results obtained with the preparation process of DE 28 55 943 C3. Besides that, the product according to the invention provides higher dyeing power.

EXAMPLE 12

Comparison Example

Preparation of a pigment blend 7a with the process according to the invention:

1 part P.Y. 138 and 0.2 parts P.O. 43 together with 1 part P.Y. 53 (nickel-titanium) with addition of 0.01 to 0.03 parts T Nuosperse® 2008 (fatty amine salt of a polymeric oleyl alcohol, ethoxylated and phosphatised) are mixed with 3 to 10 parts water. The slurry obtained is wet ground and then dried and deagglomerated.

Preparation of a pigment blend 7b of the same composition but using the preparation technique described in patent DE 28 55 943 (1):

1 part P.Y. 138 and 0.2 parts P.O. 43 together with 1 part P.Y. 53 (nickel-titanium) are mixed with 3 parts water. The slurry obtained is wet ground and then dried and deagglomerated.

Standard: pigment mixture 7b according to DE 28 55 943 inventive product 7a vs. 7b

| | DL* | Da* | Db* | DC* | DH* | DE | visual evaluation |
|---|---|---|---|---|---|---|---|
| in PU hue | −0.86 | 1.75 | 0.11 | 0.79 | −1.57 | 1.95 | redder, more brilliant |
| 1:10 brightening tinting strength | −0.05 | −0.58 | 0.10 | 0.09 | 0.58 | 0.59 | purer, yellower |
| | | | | 102% | | | |

Colour saturation and colour purity are clearly improved vis-a-vis the results obtained with the preparation process of DE 28 55 943 C3. Besides that, the product according to the invention provides clearly improved dispersability. For determining the same, a sample of the powder pigment is incorporated into a white varnish by stirring under low shearing force and samples are then taken in certain time intervals. The development of the tinting strength, which is a measure for the dispersability of the pigment, is obtained by graphic interpretation of the sample data.

| | development of tinting strength ** |
|---|---|
| product 7a according to he invention | 60.5% |
| pigment mixture 7b according to DE 28 55 943 | 27.4% |

** Tinting strength in %, obtained relative to the fully dispersed sample after 20 min dissolution at 2000 rpm (low shearing effect) in a medium-heavy oily alkyd-resin white varnish.

EXAMPLE 13

Preparation of a Pigment Blend 8 with the Process According to the Invention 1 part P.R. 254 together with 2 parts P.Br. 24 (chromium-titanium) with addition of 0.02 to 0.06 parts of Tego® Dispers 745W (organically modified polyacrylate) and 0.005 to 0.01 parts T Nuosperse® FX 600 (polymaleic acid ammonium salt) are mixed with 3 to 10 parts water. The slurry obtained is wet ground and then dried and deagglomerated.

As illustrated in FIG. 4, the pure organic pigment has a typical particle size distribution between 0.01 and 0.1 μm. Inorganic mixed-phase metal oxide pigments are typically in the range between 0.1 and 1.0 μm. The particle size distribution of FIG. 4, determined by photon-correlation spectroscopy, shows that dry mixing of organic and inorganic pigments results in a bimodal distribution. Product 8 of the invention has a monomodal distribution with an average particle size slightly greater than that of the pure inorganic pigment. The presence of particles with a size below 0.1 μm, which would have to be associated with the pure inorganic pigment, could not be found in product 8. This confirms that the organic pigment particles adhere to the surface of the about 10 times larger inorganic pigment particles.

The invention claimed is:

1. A composite pigment based on at least one inorganic pigment and at least one organic pigment, wherein the pigment contains composite particles in which organic pigment particles adhere to inorganic pigment particles, and wherein the organic pigment particles are more finely divided than the inorganic pigment particles, and further wherein the composite particles have an organic macromolecular coat, wherein the organic macromolecular coat is a surface-active organic macromolecular coat and wherein the particles of the inorganic and organic pigments are wet ground in the presence of the organic macromolecular coat, and the inorganic pigment particles comprising at least one of nickel-antimony-titanium oxide and chromium-antimony-titanium oxide; and, a surface of the composite particles which contain the inorganic and organic pigment particles, are provided with an additional siloxane and/or silane coat to reduce attrition by abrasion and to improve dispersibility.

2. A composite pigment based on at least one inorganic pigment and at least one organic pigment, wherein the pigment contains composite particles in which organic pigment particles of an average particle size of 0.025 to 0.3 μm adhere to inorganic pigment particles of an average particle size of 0.2 to 4 μm, wherein the organic pigment particles are more finely divided than the inorganic pigment particles and are smaller than the inorganic pigment particles by a factor of 3 to 40, that the composite particles have an average particle size of 0.5 to 5 μm, and further wherein the composite particles have an organic macromolecular coat, wherein the organic macromolecular coat is a surface active organic macromolecular coat, and the inorganic pigment particles comprising at least one of nickel-antimony-titanium oxide and chromium-antimony-titanium oxide by a weight ratio of 1 part of organic pigment against 20 to 100 parts of inorganic pigments and that, referring to the total pigment fraction, the amount of the organic macromolecular coating material ranges from 0.2 to 6% by weight.

3. The composite pigment according to claim 2, wherein the organic pigments are at least one of polycyclic and azo pigments.

4. The composite pigment according to claim 2, wherein red pigments are present in the form of DPP red as diketopyrrolopyrrole, yellow pigments in the form of isoindolinone and/or benzimidazolone, orange pigments in the form of DPP-orange and/or as isoindoline and/or benzimidazolone, organic blue and green pigments as Cu-phthalocyanines, and organic brown pigments as benzimidazolone and/or disazocondensation compounds.

5. The composite pigment according to claim 4, wherein the red, orange, and yellow pigments are to be associated with the following pigment classes: diketopyrolopyrrole, quinacridones, benzimidazolones, disazo condensation products, isoindolines, isoindolinones, metal complex as high performance pigment, and the following azo pigments: PY 65, PY 74, PY 83, PY 97, PY 116, PY 183, PY 190, PY 191, and PR 112 and PR 170.

6. The composite pigment according to claim 2, wherein the composite pigment contains in addition a filler.

7. The composite pigment according to claim 6, wherein the filler is in the form of barium sulfate, talcum, silica, calcium carbonate and/or aluminum oxide.

8. The composite pigment according to claim 2, wherein the composite pigment contains additional pigments for adjusting the characteristics.

9. The composite pigment according to claim 8, wherein the composite pigment contains at least one of titanium dioxide for controlling color purity, bismuth vanadate for controlling color saturation, lithopone for controlling the degree of brightening, and tin-zinc-titanate.

10. The composite pigment according to claim 2, wherein a surface of the composite particles which contain the inorganic and organic pigment particles, are provided with an additional siloxane and/or silane coat to reduce attrition by abrasion and to improve dispersibility.

11. The composite pigment according to claim 10, wherein the siloxane coat is based on a polysiloxane compound.

12. The composite pigment according to claim 11, wherein the polysiloxane and/or polysilane compounds are provided with alkyl and/or aryl groups, wherein the alkyl groups are $C_1$-$C_{12}$ alkyl radicals and the aryl group is a naphthyl, benzyl and/or phenyl group.

13. A method for the preparation of a composite pigment comprising:

wet grinding a composite pigment in the presence of a surfactant including a macromolecular compound;

wherein the composite pigment is based on at least one inorganic pigment and at least one organic pigment and wherein the composite pigment contains composite particles in which organic pigment particles adhere to inorganic pigment particles;

the organic pigment particles are more finely divided than the inorganic pigment particles;

the composite particles have an organic macromolecular coat, wherein the organic macromolecular coat is a surface-active organic macromolecular coat, and the inorganic pigment particles comprising at least one of nickel-antimony-titanium oxide and chromium-antimony-titanium oxide; and, drying and deagglomerating an aqueous suspension from the composite particles.

14. The method according to claim 13, further comprising:

adding water-miscible organic solvents to the aqueous suspension in order to adjust surface tension and wetting characteristics.

15. The method according to claim 14, further comprising:

providing an additional siloxane and/or silane coat to a surface of the composite particles which contain the inorganic and organic pigment particles to reduce attrition by abrasion and to improve dispersibility.

* * * * *